April 21, 1964     W. R. FRIED     3,130,404
F.M. RANGE FINDER WITH DOPPLER ERROR COMPENSATION
Filed May 29, 1961     4 Sheets-Sheet 1

INVENTOR.
WALTER R. FRIED
BY
ATTORNEY.

INVENTOR.
WALTER R. FRIED.

ATTORNEY.

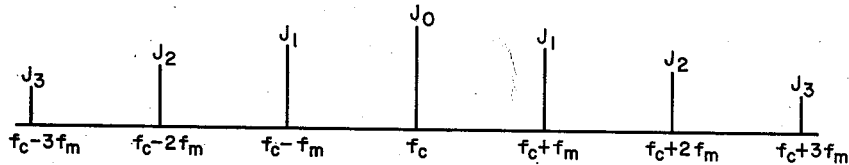
FIG. 6
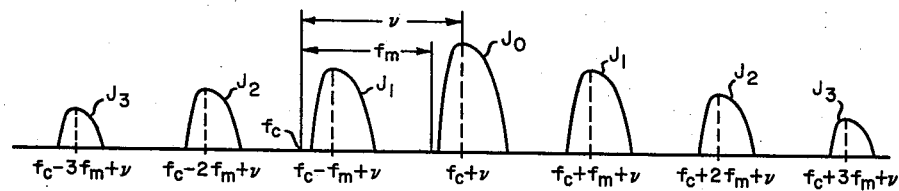
FIG. 7
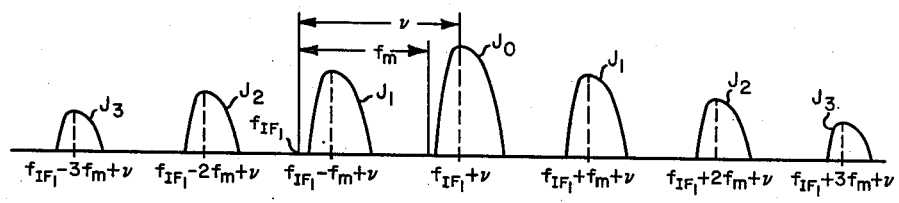
FIG. 8
FIG. 9
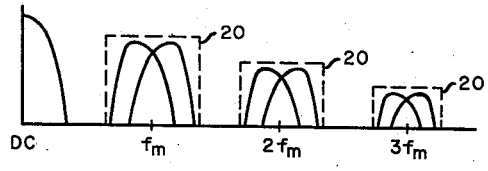
FIG. 10
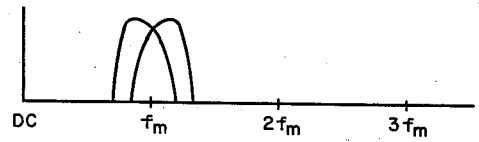
FIG. 11
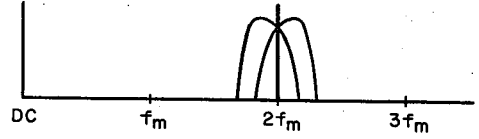
INVENTOR.
WALTER R. FRIED
BY
ATTORNEY.

United States Patent Office 3,130,404
Patented Apr. 21, 1964

3,130,404
F.M. RANGE FINDER WITH DOPPLER ERROR COMPENSATION
Walter R. Fried, Briarcliff Manor, N.Y., assignor to General Precision, Inc., a corporation of Delaware
Filed May 29, 1961, Ser. No. 113,518
10 Claims. (Cl. 343—14)

This invention relates to range finders and more particularly to frequency modulated radio range finders of the echo type in which a function of the time lapse between transmission and the reception of the echo is utilized to provide the range between the radio wave transmitter and the reflecting object or target.

Frequency modulated continuous wave radio range finders are particularly suited for use as altimeters in aircraft and missiles since they are capable of operating with a much lower power consumption than the more widely used pulse type radio range finders. Therefore, they are much lower in weight and occupy less space, both of which are secured only at a premium in manner aircraft and missiles.

This type of range finder takes advantage of the fact that a transmitted signal will be delayed a finite length of time which corresponds to twice the distance from the transmitter to the target or reflecting object. Thus, a phase comparison technique may be employed to determine the distance traveled by the radiation. However, should the distance to the target exceed one-half the wavelength of the radiation the results obtained by a phase measurement will be ambiguous. It is therefore necessary, where large distances are to be measured, that the frequency of the transmitted component which is to be phase compared be maintained as small as possible. This, however, introduces an additional complication where there is a relative velocity component along the beam between the transmitter and the target, since the radiated signal will undergo a Doppler shift. If the velocity component is large enough, a velocity ambiguity will result which may only be removed by increasing the modulating frequency. Thus it is seen that two conditions exist with respect to the modulating frequency which require, for maximum results, an opposite treatment. Where high altitude is required, the modulating frequency must be low and where a high relative velocity is required a high modulating frequency is needed. These conflicting requirements would appear to rule out the use of a frequency modulated continuous wave radio range finder as an altimeter in high performance, high altitude, vehicles such as rockets, missiles, and high performance manned jet aircraft.

One object of this invention is to provide a frequency modulated continuous wave radio range finder capable of determining without ambiguity and with great accuracy the range between two widely separated objects moving relative to each other at great velocity.

Another object of this invention is to provide a frequency modulated continuous wave radio range finder suitable for use as an altimeter in high velocity aircraft with high altitude capabilities.

A further object of this invention is to provide an increase in the range capabilities of a frequency modulated continuous wave radio range finder without impairing the velocity capabilities of the equipment bearing vehicle.

The invention contemplates a frequency modulated continuous wave radio range finder for determining the range to a target, comprising means for propagating a beam of frequency modulated carrier waves having a plurality of upper and lower sidebands toward a target which has a relative velocity with respect to the propagating means and for receiving the back scattered radiation from the target, means for generating an electric signal having a frequency corresponding to the relative velocity between the propagating means and the target along the path of the beam, means for combining the unmodulated carrier waves and the signal corresponding to the relative velocity to provide a single frequency output displaced in frequency from the unmodulated carrier frequency by an amount determined by the frequency of the electric signal corresponding to the relative velocity, means for frequency modulating said single frequency output with the same frequency used for frequency modulating the carrier waves propagated toward the target, means for mixing the displaced and modulated carrier frequency spectrum and the back scattered radiation, means for filtering the mixer means output to pass a preselected bandwidth and double the frequency of the signal passed, means for multiplying the modulating frequency so that it equals the frequency of the filtered and doubled output of the filter means, and a phase comparator for comparing the phase of the multiplied modulating frequency and the filter output and supplying a signal corresponding to the phase difference between said signals.

Figure 1:
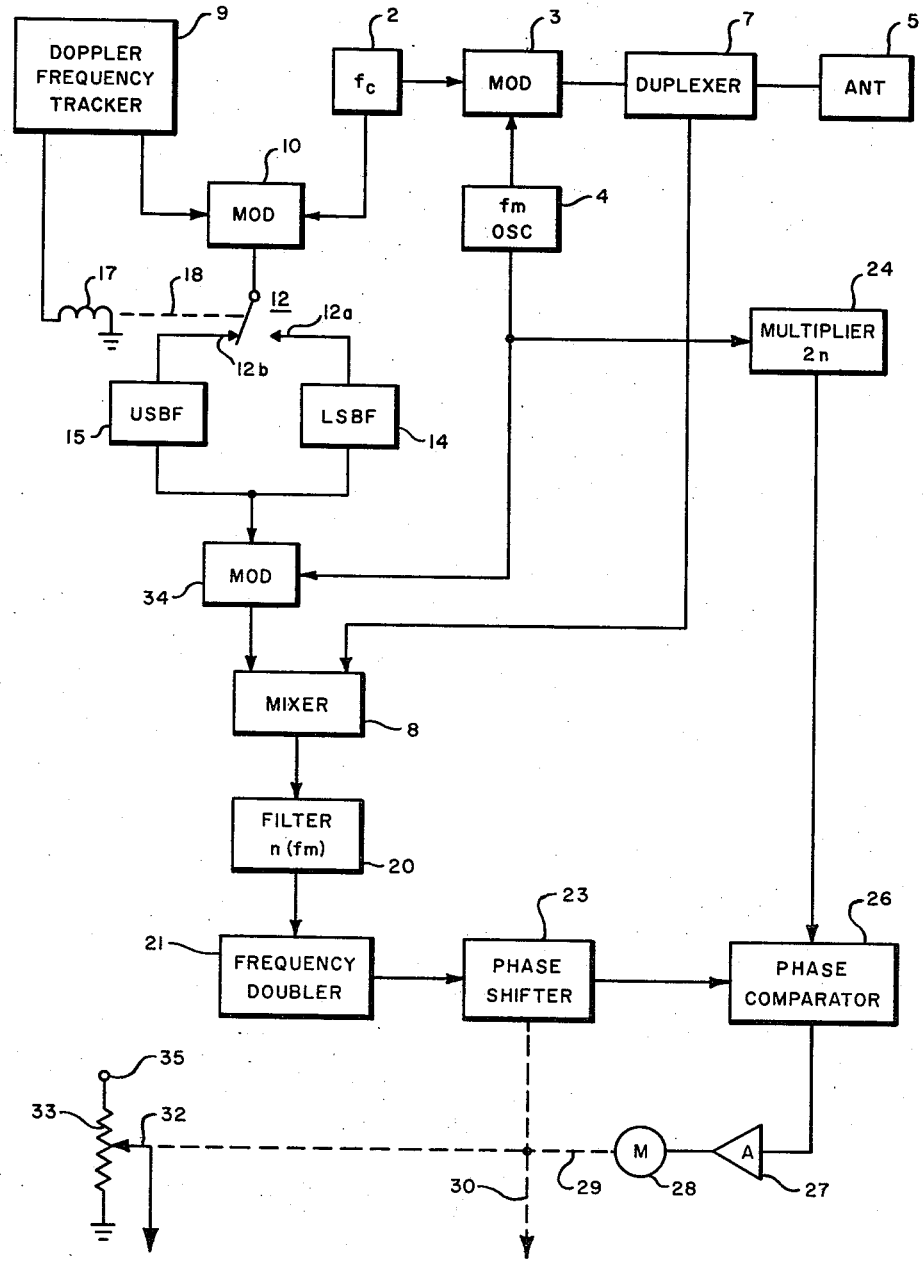
FIGURE 1 is a block diagram of a novel frequency modulated continuous wave altimeter which is suitable for use in high speed high altitude aircraft.

In FIGURE 1, an alternating voltage of frequency $f_c$ from a Klystron 2 or other high frequency generator is modulated in a modulating circuit 3 by a lower frequency alternating voltage of frequency $f_m$ from an oscillator 4. The output of modulator 3 is applied to an antenna 5 through a duplexer 7. The antenna is mounted on the aircraft and is arranged to radiate the output from modulator 3 toward the ground while the aircraft is in flight. In order that a highly accurate determination of altitude be made, antenna 5 would have to be stabilized so that the radiation, at all times, regardless of the attitude of the aircraft, is normal to the ground. If such a stabilization system is impractical in a particular application, a computer may be used to correct the errors introduced by the attitude of the aircraft. Both of these systems, that is the stabilization system or the correction system, are beyond the scope of this invention and, are therefore, not disclosed. However, they are well known in the navigation art.

The back scattered or echo energy received by antenna 5 is applied through duplexer 7 to one input of a mixer 8. A Doppler frequency tracking circuit 9 supplies an alternating electric signal which corresponds to the velocity component of the aircraft along the beam from antenna 5, on the basis of the Doppler shift of a signal of carrier frequency $f_c$, i.e., the same as that of source 2. This alternating voltage is applied to one input of a modulator 10 which has its other input connected to the high frequency alternating voltage source 2.

The output of modulator 10 ($f_c+\nu$, where $\nu$ represents the alternating signal from tracking circuit 9) is connected through a single-pole double-throw switch 12 which has one contact 12a connected by a lower sideband filter 14 and a modulator 34 to the other input of mixer 8 and its other contact 12b connected through an upper sideband filter 15 to the said other input of mixer 8 by modulator 34. Frequency tracker 9 also provides a D.C. voltage for indicating the direction of the relative movement between antenna 5 and the target, which in the case of the altimeter is the ground. This output is applied to a winding 17 of a solenoid 18 and operates switch 12. Thus, if the antenna is receding from the ground, the output of modulator 10 will be applied to modulator 34 through lower sideband filter 14 and conversely, as the antenna approaches or moves toward the ground, the output of modulator 10 will be applied to modulator 34 through upper sideband filter 15. Considering the case set forth here, the antenna is approaching the ground at some velocity, thus, the output from modulator 10 is applied through upper sideband filter 15 to modulator 34. A second input to modulator 34 is a modulating signal from oscillator 4 which is used to frequency modulate the signal at the first input of modulator 34. The output of modulator 34 is thus a spectrum of upper and lower sidebands centered at $(f_c+\nu)$ in this instance, separated by the frequency $f_m$, said output is connected to one input of mixer 8. The input to mixer 8 from duplexer 7 will contain the Doppler shifted carrier frequency $f_c$ and upper and lower sidebands spaced from this frequency at intervals equal in frequency to the frequency of $f_m$ from oscillator 4.

Referring now to FIGURE 6, we see a typical energy distribution of the radiated energy. The designations $J_0$, $J_1$, $J_2$ and $J_3$ are employed to indicate particular sidebands. Upper sideband $J_1$ is at a frequency $f_c+f_m$, upper sideband $J_2$ at a frequency $f_c+2f_m$ and upper sideband $J_3$ at a frequency $f_c+3f_m$. The lower sidebands $J_1$, $J_2$ and $J_3$ are spaced identical distances to the left of $J_0$ and are identical in shape.

FIGURE 7 shows a typical return as seen at the output of duplexer 7. The radiated energy has undergone a typical Doppler shift due to the velocity component along the beam and the output is applied to mixer 8.

As stated previously, we are considering that case where the antenna is approaching the ground. Thus, the output of modulator 10 will be passed through upper sideband filter 15 to provide us with a single frequency, $f_c+\nu$ where $\nu$ is the alternating voltage of a frequency corresponding to the velocity component of the aircraft along the beam.

The output of mixer 8 will appear as shown in FIGURE 9 since the mixing of these two frequencies has the effect of folding the spectrum of FIGURE 7 at the point $f_c+\nu$. This output is filtered in filter 20. The center frequency of this filter is equal to $n \times f_m$ where $n$ is the order of the particular sideband of interest of the beat spectrum between the return spectrum from duplexer 7 and the generated reference spectrum from modulator 34. If the first sideband is being used then $n$ will equal 1. It should be pointed out at this time that the invention will work with any sideband. However, each of the sidebands has some particular advantages and disadvantages. The first sideband, for example, permits maximum altitude. The second sideband provides a reduced maximum altitude with respect to the first sideband but with a greater degree of accuracy on the basis of the same modulating frequency. The third sideband provides an even smaller maximum altitude but, like the first, has an advantage over sideband 2 since it eliminates odd order harmonics and suppresses amplitude modulations. Therefore, the choice of a particular sideband will depend on the particular application of the invention.

Filter 20 is shown graphically in dotted line in FIGURE 9 for the first, second and third sidebands and has sufficient width to pass the superposed lower and upper sidebands chosen. This output is shown graphically in FIGURE 10 for the first order sideband case.

The output of filter 20 is frequency doubled in a doubling circuit 21 which has its output connected to a phase shifting circuit 23. The output of oscillator 4 is frequency multiplied in a multiplying circuit 24 by a factor equal to $2 \times n$ where $n$ is again equal to the number of the sideband chosen. The outputs of multiplier 24 and phase shifter 23 are phase compared in a phase comparator 26 which provides an error signal when the phase differs. This error signal is amplified in an amplifier 27 and applied to a motor 28 which turns a shaft 29. Shaft 29 drives phase shifter 23 to null the error output of phase comparator 26. A mechanical output 30 is taken off of shaft 29 which may be used to drive an indicator for indicating altitude. Shaft 29 is also connected to a slider 32 of a potentiometer 33 which is connected between a voltage source 35 and ground. The voltage appearing at slider 32 will also correspond to the altitude of the aircraft.

Figure 2:
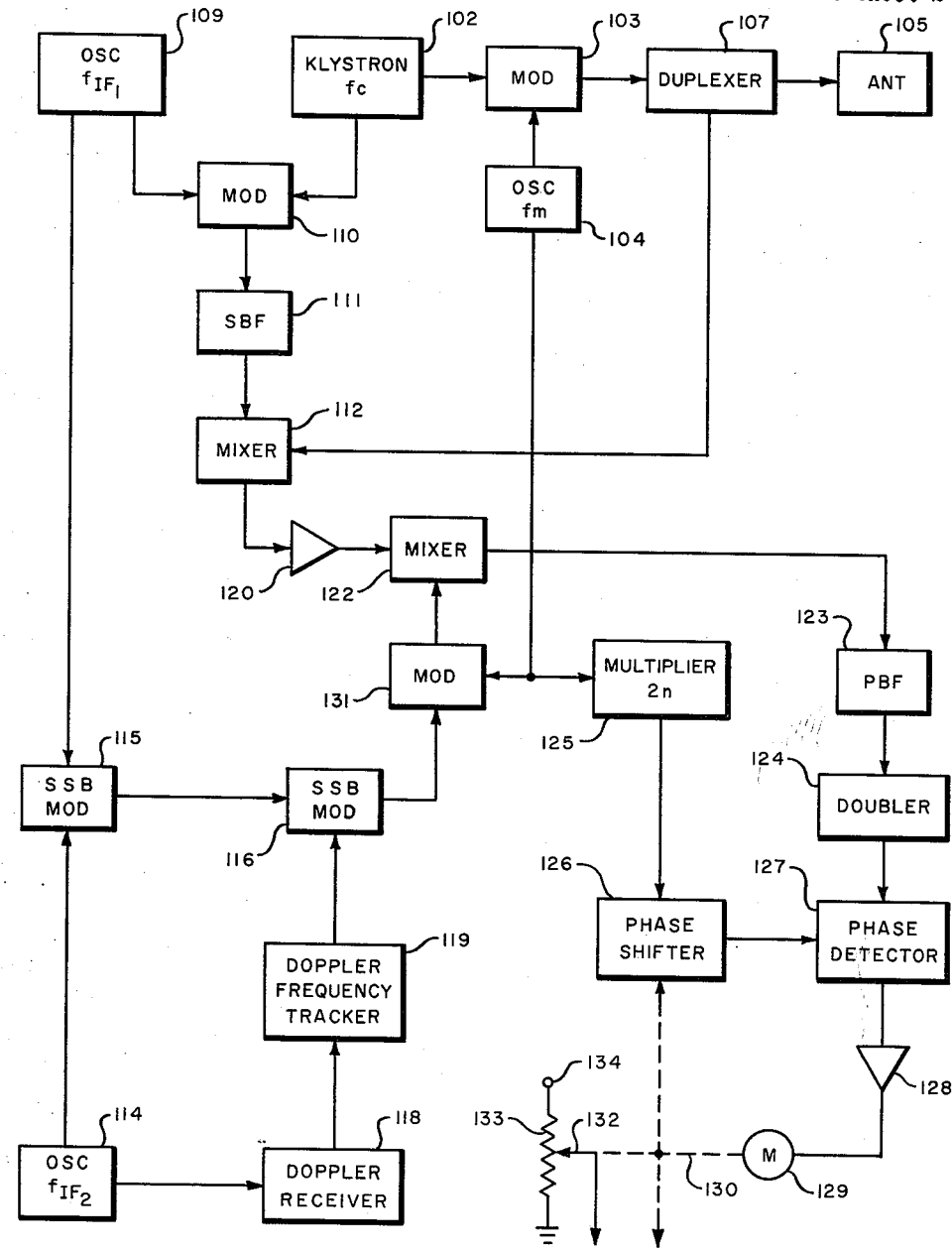
FIGURE 2 is a block diagram of another embodiment of the novel altimeter shown in FIGURE 1; and, FIGURES 3–11 are graphs showing various signal conditions.

The modification shown in FIGURE 2 is quite similar to that of FIGURE 1 with two basic exceptions. In the circuit of FIGURE 2 the signals are converted to an intermediate frequency. This is shown graphically in FIGURE 8 where the spectrum shown in FIGURE 7 has been converted to an intermediate frequency $f_{IF_1}$ from $f_c$. This change permits the use of a Doppler receiver and frequency tracker such that the frequency of the signal from the tracker itself is used to provide the sense of the Doppler shift. Thus the switch 12, the two filters 14 and 15 and the sense signal applied to solenoid winding 17 are no longer required. Also, it places the frequency band of the output of the receiver crystal mixer in a frequency range which is favorable with respect to the noise behavior of typical crystal mixers.

A Klystron 102 supplies a high frequency alternating output which is modulated in a modulator 103 by a lower frequency alternating output from an oscillator 104. The output of modulator 103 is applied through a duplexer 107 to an antenna 105 which may be identical to the antenna 5 of FIGURE 1. The output from Klystron 102 and an intermediate frequency signal of frequency $f_{IF_1}$ from an oscillator 109 are applied to a modulator 110. The output from modulator 110 is passed through a sideband filter 111 and applied to one input of a mixer 112. The other input of mixer 112 is connected to the output of duplexer 107 and receives the back scattered or echo energy from antenna 105.

A second intermediate frequency $f_{IF_2}$ from an oscillator 114 and the first intermediate frequency $f_{IF_1}$ are both applied to a single sideband modulator 115 which has its output connected to a second single sideband modulator 116.

A Doppler receiver 118 of conventional design is also connected to oscillator 114 and the received signal is converted to intermediate frequency $f_{IF_2}$. The output is passed through a frequency tracker 119 and applied to the other input of single sideband modulator 116. The output of single sideband modulator 116 is fed to a modulator 131. A signal from oscillator 104 is applied to the other input of modulator 131 for the purpose of frequency modulating the output signal of single sideband modulator 116.

The output from mixer 112 is amplified in amplifier 120 and applied to one input of a mixer 122, and the output from modulator 131 is applied to the other input of mixer 122. The output from mixer 122 is passed through, successively, a bandpass filter 123 and a frequency doubler 124. Bandpass filter 123 has a pass band centered at a frequency which is equal to $n \times f_m$ where $n$ is the order of the sideband of interest of the beat spectrum between the converted return from mixer 112 and the generated reference spectrum from modulator 131.

The output from oscillator 104 is frequency multiplied in a multiplying circuit 125 which multiplies $f_m$ by a factor equal to $2n$. Here again $n$ is the order of the sideband selected for operation. This output is phase shifted in a circuit 126 and the phase shifted output and the output of frequency doubler 124 are applied to a phase detecting system 127 which provides an error signal corresponding to the difference in phase between the two inputs.

This error signal is amplified in an amplifier 128 and drives a motor 129 which turns an output shaft 130. Shaft 130 is also connected to phase shifter 126 to null the error signal as well as indicate the altitude of the aircraft. Shaft 130 is also connected to a slider 132 of a potentiometer 133 which is connected between a voltage source 134 and ground. The voltage appearing at slider 132 provides a voltage for indicating the aircraft's altitude.

Operation

It was pointed out above that simultaneous high altitude and high velocity operation place inconsistent requirements on the modulating frequency of a frequency modulated continuous wave range finder. These requirements may be stated mathematically as follows:

For the first sideband ($J_1$)

$$h_{max.} = \frac{c}{2f_m}$$

where
$h_{max}$=maximum unambiguous altitude
$c$=velocity of light
$f_m$=modulating frequency For the second sideband ($J_2$)

$$h_{max.} = \frac{c}{4f_m}$$

And for the third sideband ($J_3$)

$$h_{max.} = \frac{c}{6f_m}$$

Thus it is seen that $h_{max}$ can only be increased by a corresponding decrease in the modulating frequency $f_m$. However, velocity ambiguity must also be accounted for since it imposes a limitation on the maximum velocity along the beam and is interrelated with the modulating frequency $f_m$ in the following manner:

$$f_m \geq 2v_{max}$$

where
$f_m$=the modulating frequency
$v_{max}$=the frequency of Doppler shift due to velocity along the beam of interest Also $$v_{max.} = \frac{2V_{max.}}{\lambda}$$

where
$V_{max}$=maximum vehicle velocity in the direction of interest
$\lambda$=the wavelength of transmission and combining the two preceding equations gives $$(f_m)\ minimum = \frac{4V_{max.}}{\lambda}$$

and transposing gives $$V_{max.} = \frac{f_m \lambda}{4}$$

From the above it is obvious that $V_{max}$ can only be increased by a corresponding increase in the modulating frequency $f_m$.

If in a particular application using the $J_2$ sideband, for example, the modulating frequency ($f_m$) is decreased from 50,000 c.p.s. to 5,000 c.p.s. the unambiguous altitude range is increased from just under 10,000 feet to just under 100,000 feet. However, if no other corrective measures are taken, the maximum allowable relative velocity, along the beam of interest, between the antenna and the target is reduced by a factor of 10. It is possible to select a value of $f_m$ which represents a compromise on performance but such a system would be altogether inadequate for use in modern high performance aircraft since neither the velocity or altitude capabilities of the vehicle could be realized and still obtain an accurate indication of absolute altitude.

Figure 3:
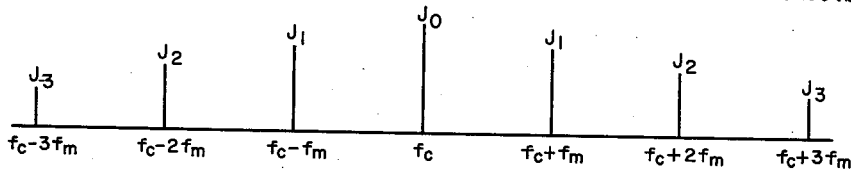

FIGURES 3, 4a, 4b, 5a and 5b show graphically the effect of velocity ambiguity. In FIGURE 3 the radiation from the antenna is shown graphically and in FIGURES 4a and 4b the back scattered return for vehicle velocities $V_1$ and $V_2$, respectively. The Doppler effect due to the velocity of the vehicle is responsible for shifting the various sidebands in FIGURE 4b to the right.

Figure 4A:
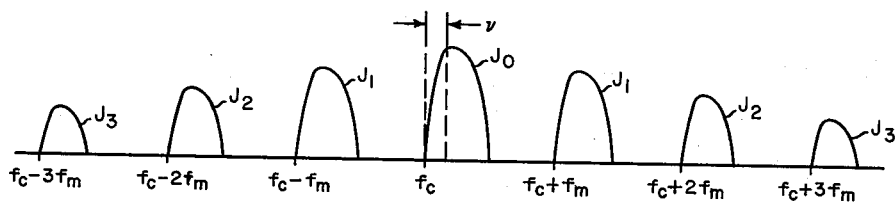
Figure 4B:
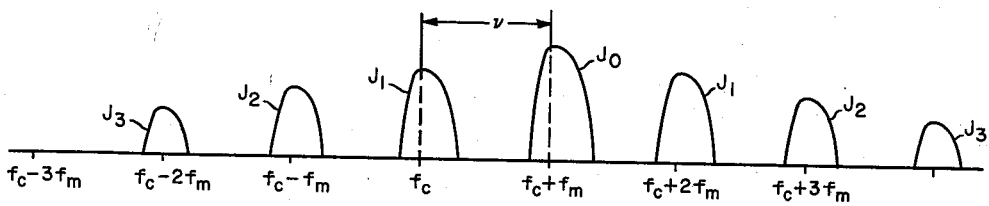
Figure 5A:
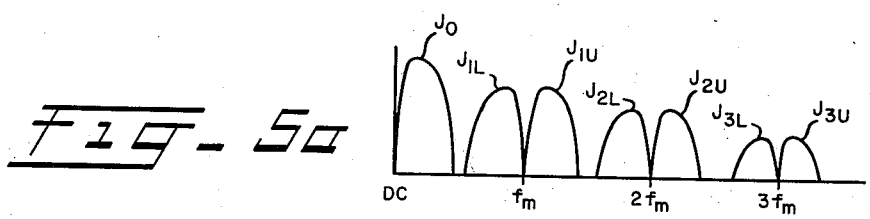
Figure 5B:
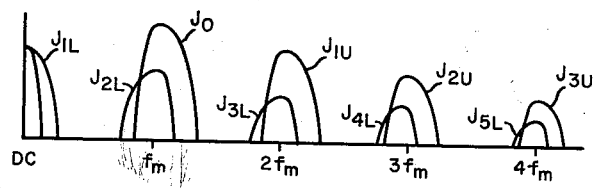

FIGURES 5a and 5b show graphically the results obtained by mixing the returns shown in FIGURES 4a and 4b with $f_c$, or the modulation spectrum about $f_c$, respectively. In the case of FIGURE 5a $$f_m \geq \frac{4V_{max.}}{\lambda}$$

and the spectrum obtained (see FIGURE 5a) is unambiguous. However, the spectrum obtained in FIGURE 5b is ambiguous since $$f_m < \frac{4V_{max.}}{\lambda}$$

and therefore the sideband pairs $J_1$ upper and $J_1$ lower, etc., are so widely separated that they overlap the other sidebands and thus the average power of the selected sideband pair cannot be determined without ambiguity.

The circuit shown in FIGURE 1 overcomes the velocity ambiguity in those cases where $$f_m < \frac{4V_{max.}}{\lambda}$$

by mixing $f_c$ from generator 2 with $v$ from the Doppler frequency tracker 9 and then mixing a reference spectrum about $f_c \pm v$, as the case may be, with the echo or back scattered return; thus the foldover takes place at $f_c \pm v$. In view of the fact that each sideband is shifted an amount proportional to the vehicle velocity the ambiguity is avoided.

FIGURE 6 shows the transmitted power at antenna 5; FIGURE 7 the echo or back scattered return at duplexer 7; FIGURE 9 the spectrum after foldover which takes place at $f_c \pm v$ in mixer 8; FIGURE 10 the upper and lower sidebands after filtering in filter 20; and, FIGURE 11 the output after doubling in circuit 21. Doubling produces the sharp spike at the average power of the two sidebands and it is this spike at $2f_m$ which is phase compared with the appropriately multiplied output from oscillator 4 to provide a signal which corresponds to the time delay in transmission and the altitude or range between the antenna and the target.

The circuit shown in FIGURE 2 operates in substantially the same way as that shown in FIGURE 1 with one notable exception. In FIGURE 2 the signals are converted to an intermediate frequency $f_{IF_1}$ which provides two advantages. First, it lessens the circuit requirements and, second, it places the frequency band of the output of mixer 112 in a frequency range which is favorable with respect to the noise behavior of typical crystal mixers. FIGURE 8 shows the form the return signal takes after it is modified by conversion to the intermediate frequency $f_{IF_1}$.

The conversion of the return, FIGURE 7, is accomplished by modulating $f_c$ by an intermediate frequency $f_{IF_1}$ in modulator 110 and filtering the output of the modulator in side band filter 111 and applying the output ($f_c - f_{IF_1}$) along with the return (FIGURE 7) to mixer 112 which provides the converted output (FIGURE 8).

Foldover according to the invention is achieved at $f_{IF_1} \pm v$ where the sign of $v$ indicates the relative direction of motion of the target with respect to the antenna, by mixing the amplified output of mixer 112 (FIGURE 8) with a spectrum centered at $f_{IF_1} \pm v$ which is generated by first modulating $f_{IF_1}$ by a second intermediate frequency $f_{IF_2}$ from oscillator 114 in a single sideband modulator 115 to obtain $f_{IF_1} - f_{IF_2}$ and by converting the Doppler signal from receiver 118 to the $f_{IF_2}$ intermediate frequency so that the frequency tracker 119 output is $f_{IF_2} \pm v$. These two signals ($f_{IF_1} - f_{IF_2}$) and ($f_{IF_2} \pm v$) are applied to a second single sideband modulator whose output is applied to one input of frequency modulator 131. A modulating signal from oscillator 104 is applied to the other input of modulator 113. The output of modulator 131 provides the desired output spectrum centered at ($f_{IF_1} \pm v$) to mixer 122. The remainder of the circuit is identical to FIGURE 1 and operates in the same way. It should be noted that Doppler receiver 118 has a modulating frequency $f_{m_2}$ which is sufficiently high to provide unambiguous velocity information and, in addition, may, if a completely independent system is not desired, be constructed to utilize Klystron 102, modulator 103, oscillator 109, modulator 110, duplexer 107, antenna 105, sideband filter 111, mixer 112 and amplifier 120, thereby time-sharing these circuits which are employed to determine the altitude as previously described.

While two specific embodiments of this invention have been shown and described in detail for illustration purposes, it is to be expressly understood that the invention is not to be limited thereto.

What is claimed is:

1. A frequency modulated continuous wave radio range finder comprising, means for propagating a beam of frequency modulated carrier waves having a plurality of upper and lower sidebands toward a target which has a relative velocity with respect to the propagating means and for receiving the back scattered radiation from the target, means for displacing the carrier wave frequency by an amount corresponding to the velocity between the propagating means and the target along the beam of radiated energy, means for frequency modulating the displaced carrier wave by the modulating frequency with which the carrier waves are modulated, a mixer responsive to the modulated displaced carrier wave and to the received back scattered radiation from the target for mixing the displaced modulated carrier and the received back scattered radiation so that corresponding upper and lower side bands of the received spectrum overlie each other, means responsive to said mixer output for selecting and doubling the frequency of one pair of said corresponding sidebands, means for multiplying the modulating frequency so that it equals the doubled frequency, and means for comparing the phases of the doubled frequency and the multiplied modulating frequency and for providing a signal which corresponds to the phase difference between said signals being phase compared.

2. A range finder as set forth in claim 1 in which the means for displacing the carrier wave frequency includes a modulator connected to the carrier wave source and to a Doppler frequency tracker system which provides an alternating Doppler signal having a frequency which corresponds to the relative velocity between the propagating means and the target.

3. A frequency modulated continuous wave radio range finder comprising, means for propagating a beam of frequency modulated carrier waves having a plurality of upper and lower sidebands toward a target which has a relative velocity with respect to the propagating means and for receiving the back scattered radiation from the target, means for displacing the carrier wave frequency by an amount corresponding to the velocity between the propagating means and the target along the beam of radiated energy, means for frequency modulating the displaced carrier wave by the modulating frequency with which the carrier waves are modulated, a mixer responsive to the modulated displaced carrier wave and to the received back scattered radiation from the target for mixing the displaced modulated carrier and the received back scattered radiation so that corresponding upper and lower sidebands of the received spectrum overlie each other, means responsive to said mixer output for selecting and doubling the frequency of one pair of said corresponding sidebands, means for multiplying the modulating frequency so that it equals the doubled frequency, a phase comparator responsive to the multiplied modulating frequency and connected to said doubling means by an adjustable phase shifter for comparing the phase difference between the multiplied modulation frequency and the selected and doubled sidebands and for supplying an output corresponding to the difference in phase, and servo means responsive to the output from said phase comparator for adjusting the phase shifter to null the comparator output.

4. A range finder as set forth in claim 3 in which the means for displacing the carrier wave frequency includes a modulator connected to the carrier wave source and to a Doppler frequency tracker system which provides an alternating Doppler signal having a frequency which corresponds to the relative velocity between the propagating means and the target.

5. A frequency modulated continuous wave radio range finder comprising, means for propagating a beam of frequency modulated carrier waves having a plurality of upper and lower sidebands toward a target which has a relative velocity with respect to the propagating means and for receiving the back scattered radiation from the target, means for generating an electric signal corresponding in frequency to the relative velocity between the propagating means and the target, means for combining the unmodulated carrier waves and the signal corresponding to the relative velocity to provide a single frequency output displaced in frequency from the unmodulated carrier frequency by an amount equal to the frequency of the signal which corresponds to the relative velocity, means for frequency modulating the displaced carrier wave by the modulating frequency with which the carrier waves are modulated, means for mixing the modulated displaced carrier and the back scattered radiation, means for filtering the mixer means output to pass a preselected band of frequencies and for doubling the frequency of the signal passed, means for multiplying the modulating frequency so that it equals the frequency of the filtered and doubled output of the filter means, and a phase comparator for comparing the phase of the multiplied modulating frequency and the filter output and for supplying a signal corresponding to the phase difference between said signals.

6. A frequency modulated continuous wave radio range finder comprising, means for propagating a beam of frequency modulated carrier waves having a plurality of upper and lower sidebands toward a target which has a relative velocity with respect to the propagating means and for receiving the back scattered radiation from the target, means for generating an alternating electric signal corresponding in frequency to the relative velocity between the propagating means and the target and a voltage corresponding to the relative direction of movement between the said target and propagating means, means responsive to the alternating signal, the voltage and the unmodulated carrier waves for providing a single frequency output displaced in frequency from the unmodulated carrier by an amount equal to the frequency of the alternating signal, means for frequency modulating the displaced carrier wave by the modulating frequency with which the carrier waves are modulated, means for mixing the modulated displaced carrier and the back scattered radiation, means for filtering the mixer means output to pass a preselected band of frequencies and for doubling the frequency of the passed signal, means for multiplying the modulating frequency so that it equals the doubled frequency, a phase comparator responsive to the multiplied modulating frequency and connected to said doubling means by an adjustable phase shifter for comparing the phase difference between the multiplied modulating frequency and the output of the doubler and for supplying an output corresponding to the difference in phase, and servo means responsive to the output from the phase comparator for adjusting the phase shifter to null the comparator output.

7. A radio range finder as set forth in claim 6 in which the means responsive to the alternating signal, the voltage and the unmodulated carrier for providing a single frequency output displaced in frequency from the unmodulated carrier by an amount equal to the frequency of the alternating signal comprises, a modulator for mixing the alternating signal and the unmodulated carrier, a lower sideband and an upper sideband filter and selective means responsive to the voltage corresponding to the relative direction of movement between the propagating means and the target for selectively connecting the output of the modulator to one only of said filters in accordance with the said voltage.

8. A frequency modulated continuous wave radio range finder comprising, means for propagating a beam of frequency modulated carrier waves having a plurality of upper and lower sidebands toward a target which has a relative velocity with respect to the propagating means and for receiving the back scattered radiation from the target, an oscillator for supplying an alternating signal having a frequency lower than the frequency of the unmodulated carrier waves, first modulating means responsive to the output from said oscillator and said unmodulated carrier waves for providing an alternating signal having a frequency which differs from the unmodulated carrier wave frequency by an amount equal to the frequency of the signal from the oscillator, a first mixer responsive to the output from said first modulating means and to the received back scattered radiation from the target, a Doppler frequency tracking system for providing an alternating Doppler frequency electric signal having a frequency which corresponds to the relative velocity between the propagating means and the target, conversion means responsive to the output from the said oscillator and said Doppler tracking system for converting the output from the Doppler frequency tracking system to a frequency which is displaced from the frequency of the signal from the first modulating means by an amount equal to the magnitude of the Doppler signal, a second modulating means for frequency modulating the signal from said converting means by the modulating frequency with which the carrier waves are modulated, a second mixer responsive to the first mixer output and the modulated converted Doppler signal for folding the output spectrum from the first mixer so that corresponding upper and lower sidebands overlie each other, means for filtering and doubling a preselected frequency component from the second mixer output, means for multiplying the modulating frequency so that it equals in frequency the filtered and doubled frequency component from the second mixer output, and means for comparing the phases of the doubled frequency and the multiplied modulating frequency and for providing a signal corresponding to the phase difference between said signals.

9. A radio range finger as set forth in claim 8 in which the means responsive to the oscillator for converting the Doppler signal comprises, a single sideband modulator connected to the said oscillator, a second oscillator having a lower frequency than the above mentioned oscillator connected to said single sideband modulator and to the Doppler frequency tracking system for biasing the output from said system, a second single sideband modulator responsive to the output from the first single sideband modulator and the biased Doppler signal for providing a signal displaced from the first mentioned oscillator frequency by an amount corresponding to the Doppler frequency.

10. A frequency modulated continuous wave radio range finder comprising, means for propagating a beam of frequency modulated carrier waves having a plurality of upper and lower sidebands toward a target which has a relative velocity with respect to the propagating means and for receiving the back scattered radiation from the target, means for displacing the carrier wave frequency by an amount corresponding to the velocity between the propagating means and the target along the beam of radiated energy, means including a mixer responsive to the displaced carrier wave and to the received back scattered radiation from the target for causing corresponding upper and lower sidebands of the received back scattered radiation to overlie each other, filter means responsive to the output from said means including the mixer for selecting and doubling the frequency of one pair of said overlying corresponding sidebands, means for multiplying the modulating frequency so that it equals the doubled frequency, and means for comparing the phases of the doubled frequency and the multiplied modulating frequency and for providing a signal which corresponds to the phase difference between said signals being phase compared.

References Cited in the file of this patent

UNITED STATES PATENTS

| | | |
|---|---|---|
| 2,253,975 | Guanella | Aug. 26, 1941 |
| 2,834,956 | Harris | May 13, 1958 |
| 2,991,467 | Clarke | July 4, 1961 |
| 3,026,515 | Rey | Mar. 20, 1962 |